United States Patent Office 3,704,086
Patented Nov. 28, 1972

3,704,086
PRODUCTION OF HIGHLY CONCENTRATED, STABLE STOCK SOLUTIONS CONTAINING 1:2 METAL COMPLEX DYES IN A SINGLE STEP REACTION
Dimiter Bayew, 6 Gontardstrasse, 6800 Mannheim, Germany; and Manfred Daeuble, 33 Brunckstrasse, 6710 Frankenthal, Germany; and Otto Kaufmann, 52 Rheinrugenstrasse; Ludsteck Enno, 12 Woehlerstrasse; Dieter Ludsteck, 39 Rheinrugenstrasse; Helmut Pfitzner, 6 Liebermannstrasse; and Heinz-Guenter Witsch, 2 Ungsteiner Strasse, all of 6700 Ludwigshafen, Germany
No Drawing. Continuation-in-part of application Ser. No. 693,162, Dec. 26, 1967. This application June 1, 1970, Ser. No. 42,561
Claims priority, application Germany, Dec. 29, 1966, P 16 19 357.0
Int. Cl. D06p 1/10
U.S. Cl. 8—42                                         5 Claims

ABSTRACT OF THE DISCLOSURE

Production of highly concentrated stable stock solutions containing 1:2 metal complex dyes in a single step reaction comprising contacting the corresponding azo dyes in oxygen containing water-miscible solvents with a metallizing agent. The dye solutions are useful for dyeing natural or synthetic polyamides.

---

This application is a continuation-in-part of U.S. application No. 693,162 filed on Dec. 26, 1967 (now abandoned).

Nitrogenous fibrous material, for example wool, silk or synthetic polyamide fibers, is mainly dyed or printed with anionic dyes. Dyeings particularly fast to light, washing and perspiration are obtained when 1:2 chromium or 1:2 cobalt complexes of azo dyes are used. These dyes are usually supplied in the form of fine powders containing extenders and these have to be dissolved or dispersed in the dye liquor. Not only are these intensely dyeing powders unpleasant to handle because they dust and tend to agglomerate, but also the dissolution or dispersion of the solid dyes in the dye liquor offers great difficulty because they usually are inadequately soluble in water.

Pale to medium shades are dyed from long liquors and therefore there is usually no difficulty in dissolving the dyes, especially as boiling temperatures or temperatures above 100° C. are used as a rule. When dyeing in full shades however, especially navy blue and black, it is often impossible to bring the metal complex dyes free from sulfonic acid groups completely into solution even at the boiling temperature. They may then be deposited in undissolved form on the material being dyed and cause poor fastness to abrasion. Particular difficulties are encountered when the dye liquor flows through the textile material, for example in cheese or beam dyeing. Undissolved particles of dye may be filtered off and precipitated on the textile material, resulting in particularly low fastness to abrasion.

Particularly great difficulties arise when relatively high concentrations of dye have to be used for continuous dyeing methods and in textile printing. Unless the undissolved particles contained in the liquor or paste are adequately dispersed, unlevel and speckled dyeings or prints are obtained.

Satisfactory dispersion of the sparingly soluble metal complex dye powder used can be achieved by grinding it together with dispersing agents, for example reaction products of formaldehyde with naphthalenesulfinic acid or phenolsulfonic acid to form an aqueous paste which is then dried to a fine, substantially homogeneous powder.

The fineness of the powder thus obtained is of course limited and it is extremely difficult, particularly in the case of dyes which are slightly soluble in water, to achieve a degree of fineness as required for example for continuous dyeing methods, because even during the grinding of the paste composed of water, dye and dispersing agent, recrystallization may occur which counteracts the necessary dispersion.

Such finely divided powder moreover contains considerable amounts of dispersing agent which may cause disturbances, particularly in continuous dyeing methods, when full shades as for example black or navy blue, are to be obtained on a material which can only absorb a very small amount of pad liquor. This is the case for example with closely woven textile goods of polyamide filaments.

It is often impossible to obtain a stable pad liquor with the large amounts of dye required because at these high concentrations strong agglomeration effects may occur which result in unlevel and very strongly speckled prints and dyeings. Moreover the large amounts of dispersing agent which are introduced with the dye disturb fixation of the dye on the fiber, especially in steaming and thermosol processes.

Attempts have already been made to obviate the difficulties in dissolving large amount of dye powder by using liquid dye formulations instead of powders. To prepare these formulations, water, dye and dispersing agent are carefully ground into a paste until the desired degree of fineness is achieved and a mobile pourable paste is obtained. It is however only possible to use dyes having very low solubility in water.

Dispersions obtainable in this way may be handled more conveniently in the preparation of pad liquors and print pastes but they have a number of serious disadvantages. Thus it is not possible to increase the dye content of the pastes beyond 15 to 20% if the pastes are to remain fluid, because at higher concentration thickening of the suspensions takes place and thixotropic effects occur which make handling extremely troublesome. Settling of the particles of dye to the bottom of the vessel is particularly troublesome; this takes place especially upon prolonged storage and may result in the formation of a compact sediment which cannot be homogeneously dispersed by shaking the vessel or by stirring. The risk of a sediment forming exists particularly when high temperatures occur owing to any external influence while the liquid dispersions are being stored. Moreover suspensions which contain water are susceptible to cold because the water may freeze and then care has to be taken by particularly cautious thawing that agglomeration does not occur and that the fine dispersion is not disturbed.

It has been found that textile material of natural or synthetic polyamides can be dyed or printed and that granular or powdered polyamides can be colored, with 1:2 metal complex dyes in dye liquors or print pastes without the said difficulties by using, for the preparation of the dye liquor or print paste, a highly concentrated stable stock solution which is capable of dilution with water in all proportions and which contains a 1:2 chromium or cobalt complex of an o,o'-dihydroxy or o-hydroxy-o'-carboxy azo dye dissolved in a solvent which contains oxygen and is miscible with water in all proportions.

We have now found a process for producing such dyes stock solutions in a single step reaction which comprises reacting said azo dyes with a metallizing agent selected from the class consisting of alkali metal bichromates, cobalt (II) hydroxide and cobalt (III) hydroxide in a solvent or solvents selected from the class consisting of completely water-miscible polyhydric alcohols, polyhydric alcohol mono alkyl ethers and open-chain or cyclic carboxylic amides.

The stock solutions thus obtained may be filtered or centrifuged and the resultant solution of the 1:2 metal complex dye can be used without further treatment.

The stock solutions are miscible in all proportions with water without precipitation of the dye, independently of whether they are diluted with water or poured into water. They may also themselves contain water, e.g. about 10%.

The stock solutions contain the 1:2-complex metal dyes in concentrations of about 15 to 30%.

Aqueous solutions which have been obtained by dilution of the stock solutions with water and which contain about 10 to 20 g. dye per liter may even be boiled for an hour while being stirred without dye being precipitated in an appreciable amount. The stock solutions have a low viscosity and are stable at temperatures far below freezing point. Similarly a rise in temperature for example to 40° to 60° C. is not detrimental, but rather the stability of the solutions is thereby improved; rise in temperature thus has an effect opposite to that in the case of suspensions containing the dispersing agent described earlier.

Solvents which are miscible with water in all proportions and which are suitable for the preparation of stock solutions include polyhydric alcohols and their monoalkyl ethers and open-chain or cyclic carboxylic amides or mixtures of such compounds. These solvents may also contain small amounts of water. The following compounds are given as specific examples: ethylene glycol, diethylene glycol, 1,2-propylene glycol, ethylene glycol mono-n-butyl ether, diethylene glycol mono-n-butyl ether, diethylene glycol monomethyl ether, dipropylene glycol, triethylene glycol, triethylene glycol mono-n-butyl ether, glycerol, pyrrolidone-2, N-methylpyrrolidone and dimethylformamide.

Alkanolamines or adducts of ethylene oxide to alcohols having more than six carbon atoms or to alkylphenols may advantageously be used as additives in small amounts, but naturally it is necessary for more ethylene oxide molecules to be added on, according to the larger number of carbon atoms, in order that the compounds should be soluble in water. For example in the case of nonylphenol, at least 6 to 7 moles of ethylene oxide is required and in the case of coconut oil alcohols or decanols having branched carbon chains, about 8 moles of ethylene oxide is required.

Suitable dyes are o,o'-dihydroxy azo dyes, o-hydroxy-o'-alkoxy azo dyes and o-hydroxy-o'-carboxy azo dyes which are free from sulfonic acid groups. The alkyl part of the alkoxy in the o-hydroxy-o'-alkoxy azo dyes is eliminated in the metallization step (dealkylating metallization).

Metallizing agents to be used for forming the complexes are alkali metal bichromates, cobalt (II) hydroxide and cobalt (III) hydroxide. The conditions of the metallization are chosen so that 1:2 complexes are formed.

The stock solutions may be used for dyeing purposes in the following way.

When dyeing in a bath, the liquor is made to circulate as usual together with assistants and the acids or buffer salts necessary for setting up the pH required, and the dye is then added in the form of the stock solution. Organic acids and bases, as for example acetic acid or triethanolamine, have proved to be best for setting up the necessary pH.

The agents conventionally used and known in dyeing with 1:2 metal complex dyes free from sulfonic acid groups, for example adducts of ethylene oxide to aliphatic alcohols or alkylphenols and their hemiesters with sulfuric acid, adducts of ethylene oxide to aliphatic amines, sulfonation products or castor oil and of oleic acid and also their amides with aliphatic amines, alkylbenzenesulfonic acids or alkylnaphthalenesulfonic acids, may be used as assistants. Mixtures of the said assistants, especially those which have no turbidity point at the boiling temperature, are particularly advantageous. These agents and mixtures of the same are known and have been widely described in the literature.

Since practically all of the compounds are surfactants, they often have a marked tendency to foam which has a very troublesome effect in bath dyeing. We have now found that after the abovementioned stock solutions containing the dye have been added, a marked antifoam effect occurs when dyeing full shades, for example black or navy blue, and when accordingly large amounts of dye are being used. When dyeing paler shades and in long liquor conditions, the antifoam effect is naturally less pronounced.

In the course of the dyeing, the dyes are absorbed very well by the fiber and excellent exhaustion of the dye liquor results, which is very important, especially in the case of full shades. Since no deposition or precipitation occurs during dyeing, the dyeings have very good fastness to abrasion. This is very important, especially in machine dyeing in which the dye liquor flows through the material.

The use of stock solutions considerably simplifies the preparation of pad liquors in continuous dyeing. Dissolving or dispersing large amounts of dye powder, which often takes a long time, is dispensed with because all that is necessary is to pour or stir the stock solution into the aqueous solution to which any assistants and thickeners may have already been added. This is particularly advantageous when for example floorcoverings or polyamide fibrous material, such as tufted or needleloom carpeting, have to be dyed continuously on a large scale and several cubic meters of pad liquor are required for each batch.

Other advantages accrue from the fact that the dyes in solutions prepared in this way exhibit considerably better building-up properties. Without varying the steaming period, the dyes are fixed better not only on synthetic polyamide fibers or wool, but also on the hard fibers used as backing for tufted and needleloom carpeting. This is important particualrly when dyeing in full shades. In addition to the better fixation of the dye there is a marked improvement in the fastness to abrasion of the dyeings as compared with dyeings obtained with powder dyes, and it is fastness to abrasion which is particularly important in the case of floorcoverings.

The difficulties which occur in the continuous dyeing of shades which are difficult to adjust, such as beige, olive, green, grey or pale brown, when using powder dyes may be avoided by using stock solutions prepared according to the new method. The necessity to use a combination of powdered yellow, orange, red and blue dyes to prepare the dye liquors often resulted in unlevel dyeings because the particles of dye could not be distributed evenly in the correct mixture on the surface of the fiber, and this was particularly noticeable in the case of pale shades. The use of dye solutions ensures absolutely homogeneous distribution of the dye in the pad liquor and consequently on the surface of the fiber, so that perfectly level and solid dyeings are obtained which do not exhibit any skitteriness.

It has also been observed that purer and clearer shades are obtained when dyeing with dissolved 1:2 metal complex dyes than when using dispersed powdered dyes. This may be due to the fact that extenders and dispersing agents present in the dye powders contain colored constituents which often cause yellowing of the material being dyed and moreover become brown under the influence of light. Since metal complex dyes generally do not give very bright dyeings, any improvement in this regard is particularly valuable.

We have further found that stock solutions prepared according to this invention are also eminently suitable for dyeing granular or powdered polyamides which are used for example for the production of filaments or moldings, particularly filaments obtained by the melt spinning method and injection moldings, provided the dye contained therein is able to withstand the high processing temperatures without decomposition.

Dyes used for mass coloration and polyamide injection moldings must satisfy particularly high standards as regards resistance to high temperature and behavior in filaments, threads and moldings. Since the processing temperature in the case of polyamides, for example of the nylon 6 or nylon 6,6 type, is about 280° C., the dyes have to be able to withstand this temperature for long periods without damage. Homogeneous dispersion of the dyes and absence of insoluble constituents of the dye or other solid impurities are very important for the properties of the finished filaments, threads and moldings and for behavior in the spinning process and in shaping. As a rule the dye incorporated into the polyamide disturbs the structure and can only be disregarded provided it has no detrimental effect on the properties, particularly the mechanical properties, of the products prepared from the polyamide. There may be trouble however if large particles of dye or impurities result in inhomogeneities in the structure of the polyamides. These inhomogeneities caused by large particles of dye or impurities are difficult to avoid when using dye powders or dispersed dyes.

The use according to this invention of stock solutions offers many advantages. The solutions may be filtered prior to use and thus freed from solids which not only cause the difficulties described above but may also result for example in the clogging of spinnerets.

It is particularly advantageous in mass coloration to use stock solutions which contain 1:2 metal complexes of azo dyes having the general Formula I:

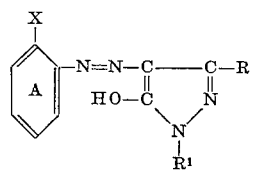

in which the ring A may bear further substituents, R denotes an alkyl, phenyl, carbalkoxy or carbamoyl radical, $R^1$ denotes a hydrogen atom or an unsubstituted or substituted phenyl radical and X denotes a hydroxy group, an alkoxy group having 1 to 4 carbon atoms or a carboxyl group.

Specific examples of X are methoxy or ethoxy and substituents for the ring A and the phenyl radical $R^1$ are for example chlorine or bromine atoms or methyl, ethyl, sulfonamide, N-alkylsulfonamide, N-arylsulfonamide, alkylsulfone or carbamoyl groups.

Examples of R are methyl, ethyl, phenyl, carbomethoxy and carboethoxy groups.

Dyes which are particularly valuable for mass coloration are 1:2 chromium complexes derived from dyes of the general Formula II:

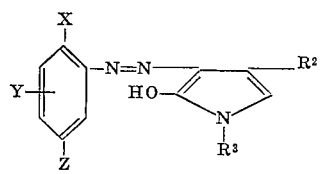

where X has the same meaning as in Formula I, Y is hydrogen or chlorine, an alkyl group having 1 to 3 carbon atoms, or an unsubstituted or N-alkyl or N-phenyl substituted sulfonamido group, Z is a hydrogen or chlorine atom or an alkyl group having 1 to 3 carbon atoms, $R^2$ is a methyl, ethyl, phenyl, carbomethoxy, carboethoxy or carbamoyl group, and $R^3$ is hydrogen or a phenyl, chlorophenyl, methylphenyl or ethylphenyl radical or a phenyl radical substituted by a sulfonamido group. The N-alkyl substituents of the sulfonamido group may bear a hydroxy or alkoxy, such as a methoxy or ethoxy, group as a substituent. Examples of suitable substituents for the N-phenyl group are chloro and methyl.

The procedure for coloring polyamide granulate or powder is the same as for dyeing fibers, i.e. a dye liquor is used. The stock solutions may however be used direct for coloring without the preparation of a liquor. The polyamide material is covered with a uniform film of the solution and the solvent is then removed.

The formation of dye agglomerates which may have very detrimental consequences in further processing is avoided by the use of stock solutions prepared according to this invention.

The following examples further illustrate the present invention. The parts and percentages specified refer to weight.

EXAMPLE 1

30.9 parts of the monoazo dye from diazotized 1-amino-2-hydroxy-4-nitrobenzene and β-naphthol, 30.9 parts of the monoazo dye from 1-amino-2-hydroxy-5-nitrobenzene and β-naphthol and 32 parts of sodium bichromate are introduced at 100° C. into a mixture of 90 parts of dimethylformamide and 90 parts of diethylene glycol mono-n-butyl ether and the whole is stirred for one hour at 110° C. and then cooled. The mobile solution is filtered to free it from possible small amounts of impurities. The solution obtained is stable even at low temperatures and may be diluted with water in all properties without precipitating the dye.

For the dyeing of 100 parts of polycaprolactam flock in 1200 parts of water at 50° C. to 60° C. in a pack dyeing machine, 1 part of the triethanolamine salt of the sulfuric acid hemiester of an adduct of 80 moles of ethylene oxide to 1 mole of oleyl alcohol and 1 part of the adduct of 7 moles of ethylene oxide to 1 mole of isooctylphenyl dissolved in water are first added and the liquor is allowed to circulate for about ten minutes. Then 11 parts of dye solution is added, the liquor is brought to the boil in the course of thirty minutes and dyeing is carried on for 1½ hours at this temperature. The direction of circulation of the liquor is alternated several times.

The dye liquor is thereafter clear and dark violet. It may be further exhausted by adding 1 part of acetic acid but this measure has no substantial effect on the depth of shade achievable. A full black dyes flock is obtained which is fast to abrasion and has excellent light and wet fastness.

EXAMPLE 2

30 parts of an aqueous cobalt hydroxide paste (which has been prepared by precipitation of 26 parts of cobalt (II) chloride with 20 parts of 50% caustic soda solution in 400 parts of water followed by suction filtration) is introduced into a mixture of 110 parts of dimethylformamide and 110 parts of diethylene glycol monobutyl ether. 61.8 parts of the monoazo dye from diazotized 1-amino-2-hydroxy-4-nitrobenzene and β-naphthol is then added at 80° C. and also 8 parts of 50% caustic soda solution and the whole is stirred for one hour at 100° C. The product is cooled and filtered. A solution is obtained which is stable even at low temperature and which can be diluted with water to any extent without showing a precipitate.

5 parts of the solution thus obtained is added in a winch dyeing machine to 100 parts of knitted goods of texturized polyamide fibers in 3000 parts of water at 60° C. and 1 part of the triethanolamine salt of the sulfuric acid hemiester of an adduct of 80 moles of ethylene oxide to 1 mole of stearyl alcohol. The dye liquor is brought to the boil within thirty minutes and kept at this temperature for one hour. A bluish violet dyeing is obtained having excellent fastness to abrasion, washing and light.

EXAMPLE 3

64.4 parts of the monoazo dye from diazotized 2-aminobenzoic acid and 1-phenyl-3-methylpyrazolone-5 and 32 parts of sodium bichromate are introduced at 100° C. into a mixture of 80 parts of dimethylformamide and 80 parts of diethylene glycol mono-n-butyl ether and then stirred for one hour at 110° C. After a trivial amount of precipitate has been separated, a mobile solution is obtained which is stable even at low temperature and which can be diluted to any extent with water.

30 parts thereof is dissolved in 500 parts of water together with 20 parts of the sodium salt of the terminally sulfonated adduct of 2 moles of ethylene oxide to 1 mole of nonylphenol and 20 parts of the adduct of 4 moles of ethylene oxide to 1 mole of nonylphenol. 20 parts of glacial acetic acid and 8 parts of alginate thickening, which have been made into a paste with ethanol, are then added. The whole is then made up with water to a total of 1000 parts. Wool tops are impregnated with the resultant liquor on a padding machine and then steamed for thirty minutes at 100° C., rinsed and dried. A reddish yellow dyeing having excellent fastness properties is obtained.

EXAMPLE 4

62.4 parts of the monoazo dye from diazotized 1-amino-2-hydroxy-5-nitrobenzene and acetoacetanilide is introduced into a mixture of 100 parts of dipropylene glycol and 100 parts of N-methylpyrrolidone. 30 parts of the cobalt (II) hydroxide paste according to Example 2 is then added, the whole is heated to 80° C. and 8 parts of 50% caustic soda solution is added. The whole is then stirred for one hour at 90° C. and a trivial amount of precipitate is suction filtered. A mobile solution is obtained which is stable even at low temperature and which can be diluted to any extent with water.

6 parts of the solution obtained is added in a winch dyeing machine to 100 parts of polyamide charmeuse goods in 3000 parts of water at 50° C. and 1 part of the triethanolamine salt of a terminally sulfonated adduct of 80 moles of ethylene oxide to oleyl alcohol. The dye liquor is brought to the boil in thirty minutes and dyeing is continued at the boil for one hour, following by rinsing and drying. A reddish yellow dyeing having excellent levelness and fastness properties is obtained.

EXAMPLE 5

65 parts of the monoazo dye from 1-amino-2-hydroxy-4-nitrobenzene and 1-phenyl-3-methylpyrazolone-5 and 32 parts of sodium bichromate are introduced at 100° C. into a mixture of 60 parts of propylene glycol, 60 parts of dimethylformamide and 60 parts of diethylene glycol monobutyl ether and stirred for one hour at 100° C. Any trivial amount of residue is filtered off. A mobile solution is obtained which remains mobile and without precipitate even when cooled to —20° C. and which can be diluted with water to an unlimited extent.

45 parts of this solution is added to a solution of 25 parts of the trisodium salt of dodecylbenzene sulfonic acid, 15 parts of the adduct of 2 moles of propylene oxide and 5 moles of ethylene oxide to 1 mole of isononanol and 15 parts of p-chlorophenylglycol ether in 800 parts of water. 5 parts of glacial acetic acid is then added and the whole made up with water to 1000 parts. Needle-loom material of polycaprolactam fibers which has been needled onto a jute cloth backing is impregnated with the padding liquor thus obtained. It is then steamed for four and a half minutes at 100° C. saturated steam temperature on a sieve drum steamer, following which the material is washed and dried. A deep red dyed material is obtained which after bonding with polymer dispersions based on acrylic acid derivatives gives a needle-loom floorcovering having excellent fastness to light, abrasion and moisture.

EXAMPLE 6

71.4 parts of the monoazo dye from diazotized 1-amino-2-methoxy-5-sulfamidobenzene and β-naphthol is introduced into a mixture of 100 parts of triethylene glycol mono-n-butyl ether and 100 parts of methylformamide and then 30 parts of an aqueous cobalt hydroxide paste (prepared in a manner analogous to Example 2) and 8 parts of 50% caustic soda is added. The mixture is then stirred for two hours at from 90° to 100° C., followed by filtration. A solution which is stable to cold and which can be diluted to an unlimited extent with water is obtained.

100 parts of wool tops is added at 50° C. to a liquor of 2200 parts of water, the assistants specified in Example 1 and 3 parts of dye solution in a top dyeing machine and the liquor is heated to 100° C. in thirty minutes. Dyeing is carried on for one hour at the said temperature and the dyed material is rinsed and dried. A bluish red dyeing is obtained having outstanding fastness to abrasion, washing and light.

EXAMPLE 7

71.4 parts of the azo dye from the diazo and coupling components of Example 6 and 32 parts of sodium bichromate are introduced at 110° C. into mixture of 110 parts of triethylene glycol and 110 parts of diethylene glycol monobutyl ether and stirred for two hours at this temperature. After any impurities present have been separated by filtration, a stable solution is obtained which is stable and miscible with water.

2 parts of this solution is added in a winch dyeing machine to 100 parts of woolen cloth and a homogeneous mixture of 4000 parts of water at 50° C., 1 part of the sodium salt of the sulfuric acid hemiester of an adduct of 80 moles of ethylene oxide to 1 mole of stearyl alcohol and 1 part of glacial acetic acid. The dye liquor is brought to the boil within thirty minutes and left for an hour at this temperature.

The dyed cloth is rinsed and dried. A blue violet dyeing is obtained having outstanding fastness to light, abrasion and moisture.

A red wool dyeing which is very fast is obtained analogously when using 2 parts of the 1:2 chromium complex solution prepared from 1-amino-2-methoxy-4-sulfamido-5-methylbenzene with sodium bichromate.

EXAMPLE 8

83.2 parts of the monoazo dye from diazotized 1-amino-2-hydroxy-5-sulfonamidobenzene and 1-carbomethoxyamino-7-hydroxynaphthalene and 32 parts of sodium bichromate are introduced at 100° C. into a mixture of 80 parts of diethylene glycol mono-n-butyl ether, 80 parts of dimethylformamide and 60 parts of dipropylene glycol and then the whole is stirred for one hour at 115° C. A mobile, stable, cold-resistant solution is obtained.

A print paste is prepared from 30 parts of this solution, 10 parts of the triethanolamine salt of decylbenzenesulfonic acid, 8 parts of the adduct of 2 moles of propylene oxide and 5 moles of ethylene oxide to 1 mole of isodecanol, 7 parts of p-chlorophenyl mono glycol ether and 30 parts of 60% acetic acid. Wool tops are printed with this paste by the vigorous method. The dye is then fixed by steaming for one hour in an atmosphere of saturated steam, rinsed, dried and stretched. A bluish grey level dyeing is obtained having excellent fastness to washing, wet treatments and abrasion.

EXAMPLE 9

37.3 parts of the monoazo dye from diazotized 1-amino-2-hydroxy-5-sulfonamidobenzene and 1-phenyl-3-methylpyrazolone-5, 33.9 parts of the monoazo dye from diazotized 1-amino-2-hydroxy-5-nitrobenzene and 1-phenyl-3-methylpyrazolone-5 and 18 parts of sodium bichromate are introduced at 95° C. into a mixture of 100 parts of dipropylene glycol, 10 parts of monoethanolamine and 100 parts of dimethylformamide and then stirred for one hour at 120° C. A stable dye solution is obtained which is miscible in all proportions with water.

3 parts thereof together with 20 parts of the sodium salt of a terminally sulfonated adduct of 2 moles of ethylene oxide to 1 mole of nonylphenol and 20 parts of the adduct of 4 moles of ethylene oxide to 1 mole of nonyl phenol are dissolved in 500 parts of water. 20 parts of glacial acetic acid and 8 parts of alginate thickening, which have been made into a paste with ethanol, are added. Then the whole is made up to a total of 1000 parts with water. Wool tops are impregnated with the resultant liquor on a padding machine and are then steamed for thirty minutes at 100° C., rinsed and dried. A reddish orange dyeing is obtained which has excellent fastness properties.

The stock solutions prepared according to the foregoing examples can be used for dyeing granular materials as specified in the following examples.

EXAMPLE 10

1000 parts of granular polycaprolactam is colored with 5 parts of the stock solution according to Example 3 in 1000 parts of water at a temperature of 98° to 99° C. for three hours with slow stirring. The whole is allowed to cool to 30° to 40° C., the liquor is drained off and the granules are washed three times with water, centrifuged and dried in vacuo (about 1 mm.) at 70° C.

The colored granulate may be spun for example by a conventional method in a melt spinning machine and stretched to textile yarn having a capillary size of about 5 den. The yellow mass-dyed filaments have very good fastness to light, wet, dry cleaning, perspiration and abrasion; the material may be spun and stretched well.

EXAMPLE 11

1000 parts of granular polycaprolactam is colored in a machine (provided with heating means, cooling means and circulating means having a filter) in an aqueous liquor at a liquor rate of 2.5:1 with 15 parts of the stock solution specified in Example 1 with an addition of 2 g. per liter of ammonium acetate at 98° to 99° C. for three hours. The dyed material is then cooled to 30° to 40° C., the granules are separated from the dye liquor, rinsed three times with water, centrifuged and dried in vacuo at 70° C. The material obtained is spun on a melt spinning machine and then stretched to textile yarn having a capillary size of about 5 den. A yellow mass-dyed yarn is obtained whose properties are similar to that of Example 10.

EXAMPLE 12

1000 parts of granular polycaprolactam is colored in an autoclave provided with stirring means, heating means and cooling means in an aqueous weakly acetic acid liquor (10 g. of 10% acetic acid per kilogram of granules, added prior to the commencement of coloring) at a liquor ratio of 1:1 with an addition of 25 parts of a stock solution (containing the 1:2 chromium complex dye of the azo dye from 1 - amino-2-methoxy-4-sulfamido-5-methylbenzene and 1-phenyl-3-methylpyrazolone-5) under a pressure of about 2 atmospheres gauge at 130° C. with slow stirring. Three hours later, the material is cooled to 30° to 40° C. and treated as described in Example 10 and 11. After the granules have been dried they are spun by a conventional method in a spinning extruder and then stretched to profiled carpet yarn having a capillary size of about 12 den. According to this method a high liquor exhaustion is achieved. The red mass-colored filaments have very good fastness to light, wet, dry cleaning, perspiration and abrasion.

EXAMPLE 13

1000 parts of dry granular polyamide is drummed for an hour at room temperature in a vacuum tumbler dryer with 10 parts of the stock solution described in Example 3 which has been filtered prior to weighing out. The solvent is then removed at elevated temperature (50° to 120° C.) under subatmospheric pressure and the product is cooled, spun by a conventional method in a spinning extruder and stretched to a filament having a capillary size of 20 den. A yellow mass-colored yarn is thus obtained which has the same very good fastness properties as that described in Example 10. The material obtained according to this method may also be spun and stretched well.

The granular material may be used for the production of moldings, for example by injection molding, or for the production of filaments.

The invention is hereby claimed as follows:

1. A process for the single step production of a highly concentrated stable stock solution of a 1:2 metal complex azo dye, said solution being capable of dilution with water in all proportions, which process comprises reacting a dye selected from the class consisting of o,o'-dihydroxy, o-hydroxy-o'-alkoxy and o-hydroxy-o'-carboxy azo dyes with a metallizing agent selected from the class consisting of alkali metal bichromates, cobalt (II) hydroxide and cobalt (III) hydroxide in at least one solvent selected from the class consisting of completely water-miscible polyhydric alcohols of 2 to 6 carbon atoms and their monoalkyl ethers in which the alkyl group has up to 4 carbon atoms, pyrrolidone-2, N-methylpyrrolidone and dimethylformamide.

2. A process as claimed in claim 1 wherein said at least one solvent is selected from the class consisting of diethylene glycol, dipropylene glycol, triethylene glycol, diethylene glycol monobutyl ether and dimethylformamide.

3. A process as claimed in claim 1 wherein the dye and metallizing agent are reacted in an amount sufficient to provide a metallized dye concentration in the solvent of about 15 to 30% by weight.

4. A process as claimed in claim 1 wherein said dye is a compound of the formula

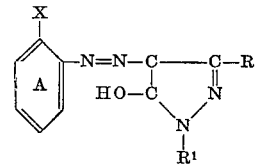

wherein the phenyl ring A may contain substituents other than X, R is alkyl, phenyl, carbalkoxy or carbamoyl, $R^1$ is hydrogen or a phenyl radical and X is hydroxy of 1 to 4 carbon atoms or carboxyl.

5. The product obtained by the process of claim 1.

References Cited

UNITED STATES PATENTS

| | | | |
|---|---|---|---|
| 2,274,751 | 3/1942 | Sowter et al. | 8—173 |
| 2,535,098 | 12/1950 | Shorey et al. | 8—173 |
| 2,888,313 | 5/1959 | Mauther | 8—54 |
| 3,265,461 | 8/1966 | Luetzel et al. | 8—172 X |
| 3,317,271 | 5/1967 | Mecco | 8—173 X |

OTHER REFERENCES

Drew et al., J. Chem. Soc., 1939, pp. 823–835.

GEORGE F. LESMES, Primary Examiner

T. J. HERBERT, JR., Assistant Examiner

U.S. Cl. X.R.

8—43, 173